(12) United States Patent (10) Patent No.: US 11,427,146 B2
Huang (45) Date of Patent: Aug. 30, 2022

(54) COLLISION PROTECTION

(71) Applicant: Pony AI Inc., Grand Cayman (KY)

(72) Inventor: Zhiling Huang, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 220 days.

(21) Appl. No.: 16/508,084

(22) Filed: Jul. 10, 2019

(65) Prior Publication Data

US 2021/0009060 A1 Jan. 14, 2021

(51) Int. Cl.
*B60R 21/0134* (2006.01)
*G01C 21/36* (2006.01)
*G06V 20/58* (2022.01)

(52) U.S. Cl.
CPC ...... *B60R 21/0134* (2013.01); *G01C 21/3697* (2013.01); *G06V 20/58* (2022.01); *B60R 2021/01345* (2013.01)

(58) Field of Classification Search
CPC ...... B60R 21/0134; B60R 2021/01345; G01C 21/3697; G06K 9/00805
See application file for complete search history.

(56) References Cited

U.S. PATENT DOCUMENTS

| | | | |
|---|---|---|---|
| 5,538,279 A | 7/1996 | Link et al. | |
| 5,815,087 A * | 9/1998 | Campbell | B60R 25/04 307/10.2 |
| 6,256,562 B1 | 7/2001 | Frimberger et al. | |
| 9,804,599 B2 * | 10/2017 | Kentley-Klay | G08G 1/202 |
| 2002/0093180 A1 * | 7/2002 | Breed | G01S 15/88 280/730.1 |
| 2004/0215382 A1 * | 10/2004 | Breed | B60N 2/2806 701/45 |
| 2005/0087381 A1 * | 4/2005 | Tobata | B60R 21/013 180/271 |
| 2007/0080825 A1 * | 4/2007 | Shiller | B62D 15/029 340/903 |
| 2007/0228705 A1 * | 10/2007 | Rao | B60R 21/01512 280/735 |
| 2015/0242803 A1 * | 8/2015 | Morby | G06Q 10/087 705/28 |
| 2018/0009418 A1 * | 1/2018 | Newman | B60S 1/0818 |
| 2019/0126922 A1 * | 5/2019 | Natroshvili | G06T 7/11 |
| 2019/0152490 A1 * | 5/2019 | Lan | G08G 1/166 |
| 2020/0189614 A1 * | 6/2020 | Ito | G06V 20/597 |

FOREIGN PATENT DOCUMENTS

KR 20110090337 A * 8/2011

* cited by examiner

*Primary Examiner* — Jelani A Smith
*Assistant Examiner* — Frank T Glenn, III
(74) *Attorney, Agent, or Firm* — Sheppard Mullin Richter & Hampton LLP

(57) ABSTRACT

Systems, methods, and non-transitory computer-readable media are provided for collision prevention. In some embodiments, a trajectory of a vehicle with respect to an object can be determined using a trajectory prediction model and sensor data associated with the vehicle and the object. Based on the trajectory, a collision event involving the vehicle and the object can be determined and one or more collision protection devices can be activated.

20 Claims, 8 Drawing Sheets

COLLISION PROTECTION

FIELD OF THE INVENTION

This disclosure relates to collision protection, more particularly, to proactive collision protection.

BACKGROUND

A traffic collision involving two vehicles can result in property damages to the vehicles and bodily injuries to the drivers and/or passengers of the vehicles. A traffic collision involving a pedestrian can result in great bodily harm to the pedestrian. After a traffic collision, the vehicles involved may need time consuming and costly repairs. There is a need to minimize the effects of a traffic collision.

SUMMARY

Disclosed herein include embodiments of a collision protection system. In some embodiments, the system comprises: a plurality of collision protection devices operationally coupled to a first object; a plurality of sensors operationally coupled to the first object; a memory storing executable instructions; and one or more processors in communication with the plurality of collision protection devices, the plurality of sensors, and the memory, the one or more processors programmed by the executable instructions to perform: receiving sensor data collected by the plurality of sensors. The one or more processors can be programmed by the executable instructions to perform: determining a first trajectory of the first object with respect to a second object using a trajectory prediction model and the sensor data. The one or more processors can be programmed by the executable instructions to perform: determining a collision event of the first object with the second object at a first contacting location with respect to the first object and a second contacting location with respect to the second object based on the first trajectory of the first object with respect to the second object. The one or more processors can be programmed by the executable instructions to perform: activating a first collision protection device of the plurality of collision protection devices, the first collision protection device at least partially on the exterior of the first object when activated, at a first time based on: one or more of a plurality of properties of the collision event, one or more of a plurality of properties of the first object, one or more of a plurality of properties of the second object, the first contacting location with respect to the first object, and the second contacting location with respect to the second object.

Disclosed herein include embodiments of collision protection system. In some embodiments, the system comprises: a plurality of collision protection devices operationally coupled to a first object; a plurality of sensors operationally coupled to the first object; a collision determination module in communication with the plurality of sensors; and an activation module in communication with the plurality of collision protection devices. The collision determination module can be configured to perform: receiving sensor data collected by the plurality of sensors. The collision determination module can be configured to perform: determining a first trajectory of the first object with respect to a second object using a trajectory prediction model and the sensor data. The collision determination module can be configured to perform: determining a collision event of the first object with the second object at a first contacting location with respect to the first object and a second contacting location with respect to the second object based on the first trajectory of the first object with respect to the second object. The activation module can be configured to perform: activating a first collision protection device of the plurality of collision protection devices, the first collision protection device at least partially on the exterior of the first object when activated, at a first time based on: one or more of a plurality of properties of the collision event, one or more of a plurality of properties of the first object, one or more of a plurality of properties of the second object, the first contacting location with respect to the first object, and the second contacting location with respect to the second object.

In some embodiments, the plurality of sensors comprises a Light Detection and Ranging (Lidar), a Radio Detection and Ranging (Radar), an imaging device, an ultrasonic sensor, a vehicle telemetry sensor, an inertial measurement unit (IMU), and a global positioning system (GPS) sensor.

In some embodiments, the first object is a first motor vehicle, and/or the second object is a person, a second motor vehicle, a building structure, a traffic control device, or a combination thereof. In some embodiments, the first object is a first motor vehicle, the second object is a second motor vehicle, and the first contacting location with respect to the first object is a rear location of the first motor vehicle.

In some embodiments, the trajectory prediction model comprises a machine learning model. The machine learning model can comprise a dynamical model, a maneuver-based model, an interaction aware model, or a combination thereof.

In some embodiments, determining said first trajectory of the first object comprises: determining the first trajectory of the first object with respect to the second object in a reference frame of the first object using the trajectory prediction model and the sensor data. In some embodiments, determining said first trajectory of the first object comprises: determining the first trajectory of the first object in an absolute reference frame; determining a second trajectory of the second object in the absolute reference frame; and determining the first trajectory of the first object with respect to the second trajectory of the second object in the absolute reference frame.

In some embodiments, the first collision protection device covers at least partially the first contacting location with respect to the first object when activated. The plurality of collision protection devices can comprise an inflatable device, a thrusting device, and an object protector.

In some embodiments, said activating comprises: activating a first activation mechanism of the first collision protection device at the first time; and activating a second activation mechanism of the first collision protection device at the second time. Said activating can comprise activating a second collision protection device of the plurality of collision protection devices, the second collision protection device is at least partially on the exterior of the first object when activated, at a second time. The one or more of the plurality of properties of the first collision protection device can comprise a first duration of the first collision protection device, and/or the one or more of the plurality of properties of the second collision protection device can comprise a second duration of the second collision protection device. The first time to activate the first collision protection device and the second time to activate the second collision protection device can be identical. The first time to activate the first collision protection device can be prior to the second time to activate the second collision protection device.

In some embodiments, the one or more processors is further programmed by the executable instructions to perform: determining the first time to activate the first collision protection device based on: one or more of a plurality of properties of the first collision protection device, the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, the one or more processors is further programmed by the executable instructions to perform the operations comprising: selecting the collision protection device, associated with the first contacting location with respect to the first object, from a plurality of collision protection devices based on the first contacting location with respect to the first object. In some embodiments, the one or more processors is further programmed by the executable instructions to perform the operations comprising: selecting the first collision protection device from a plurality of collision protection devices based on: the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, the one or more processors is further programmed by the executable instructions to perform the operations comprising: determining a desirable first trajectory of the first object; and causing the first trajectory of the first object to change based on the first trajectory of the first object and the desirable first trajectory of the first object.

In some embodiments, the one or more processors is further programmed by the executable instructions to perform the operations comprising: reporting the collision event; and/or causing a service provider to replace the collision protection device.

Disclosed herein includes embodiments of a method of collision protection. In some embodiments, the method is under control of a processor and comprises: receiving sensor data collected by a plurality of sensors operationally coupled to a first object. The method can comprise: determining a first trajectory of the first object with respect to a second object using a trajectory prediction model and the sensor data. The method can comprise: determining a collision event of the first object with the second object at a first contacting location with respect to the first object and a second contacting location with respect to the second object based on the first trajectory of the first object with respect to the second object. The method can comprise: activating a first collision protection device, at least partially on the exterior of the first object when activated, at a first time based on: one or more of a plurality of properties of the collision event, one or more of a plurality of properties of the first object, one or more of a plurality of properties of the second object, the first contacting location with respect to the first object, and the second contacting location with respect to the second object.

In some embodiments, the plurality of sensors comprises a Light Detection and Ranging (Lidar), a Radio Detection and Ranging (Radar), an imaging device, an ultrasonic sensor, a vehicle telemetry sensor, an inertial measurement unit (IMU), a global positioning system (GPS) sensor.

In some embodiments, the first object is a first motor vehicle, and wherein the second object is a person, a second motor vehicle, a building structure, a traffic control device, or a combination thereof. In some embodiments, the first object is a first motor vehicle, the second object is a second motor vehicle, and the first contacting location with respect to the first object is a rear location of the first motor vehicle.

In some embodiments, the trajectory prediction model comprises a machine learning model. The machine learning model can comprise a dynamical model, a maneuver-based model, an interaction aware model, or a combination thereof.

In some embodiments, determining said first trajectory of the first object comprises: determining the first trajectory of the first object with respect to the second object in a reference frame of the first object using the trajectory prediction model and the sensor data. In some embodiments, determining said first trajectory of the first object comprises: determining the first trajectory of the first object in an absolute reference frame; determining a second trajectory of the second object in the absolute reference frame; and determining the first trajectory of the first object with respect to the second trajectory of the second object in the absolute reference frame.

In some embodiments, the first collision protection device covers at least partially the first contacting location with respect to the first object when activated. The first collision protection device can comprise an inflatable device, a thrusting device, an object protector, or a combination thereof.

In some embodiments, said activating comprises: activating a first activation mechanism of the first collision protection device at the first time; and activating a second activation mechanism of the first collision protection device at the second time. Said activating can comprise activating a second collision protection device, at least partially on the exterior of the first object when activated, at a second time, and wherein the second collision protection device is selected based on one or more of a plurality of properties of the first collision protection device and one or more of a plurality of properties of the second collision protection device. The one or more of the plurality of properties of the first collision protection device comprise a first duration of the first collision protection device, and wherein the one or more of the plurality of properties of the second collision protection device comprises a second duration of the second collision protection device. The first time to activate the first collision protection device and the second time to activate the second collision protection device can be identical. The first time to activate the first collision protection device can be prior to the second time to activate the second collision protection device.

In some embodiments, the method further comprises: determining the first time to activate the first collision protection device based on: one or more of a plurality of properties of the first collision protection device, the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, the method further comprises: selecting the collision protection device, associated with the first contacting location with respect to the first object, from a plurality of collision protection devices based on the first contacting location with respect to the first object.

In some embodiments, the method further comprises: selecting the first collision protection device from a plurality of collision protection devices based on: the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, the method further comprises: determining a desirable first trajectory of the first object; and causing the first trajectory of the first object to change based on the first trajectory of the first object and the desirable first trajectory of the first object.

In some embodiments, the method further comprises: reporting the collision event; and/or causing a service provider to replace the collision protection device.

Disclosed herein include embodiments of a non-transitory computer readable medium comprising instructions that, when executed, cause one or more processors to perform: receiving sensor data collected by the plurality of sensors operationally coupled to the first object. The instructions, when executed, cause the one or more processors to perform: determining a collision event of the first object with the second object at a first contacting location with respect to the first object and a second contacting location with respect to the second object based on a first trajectory of the first object with respect to a second object. The instructions, when executed, cause the one or more processors to perform: activating a first collision protection device of the plurality of collision protection devices, the first collision protection device at least partially on the exterior of the first object when activated, at a first time based on: one or more of a plurality of properties of the collision event, one or more of a plurality of properties of the first object, one or more of a plurality of properties of the second object, the first contacting location with respect to the first object, and the second contacting location with respect to the second object.

In some embodiments, the instructions, when executed, cause the one or more processors to perform: determining a first trajectory of the first object with respect to a second object using a trajectory prediction model and the sensor data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
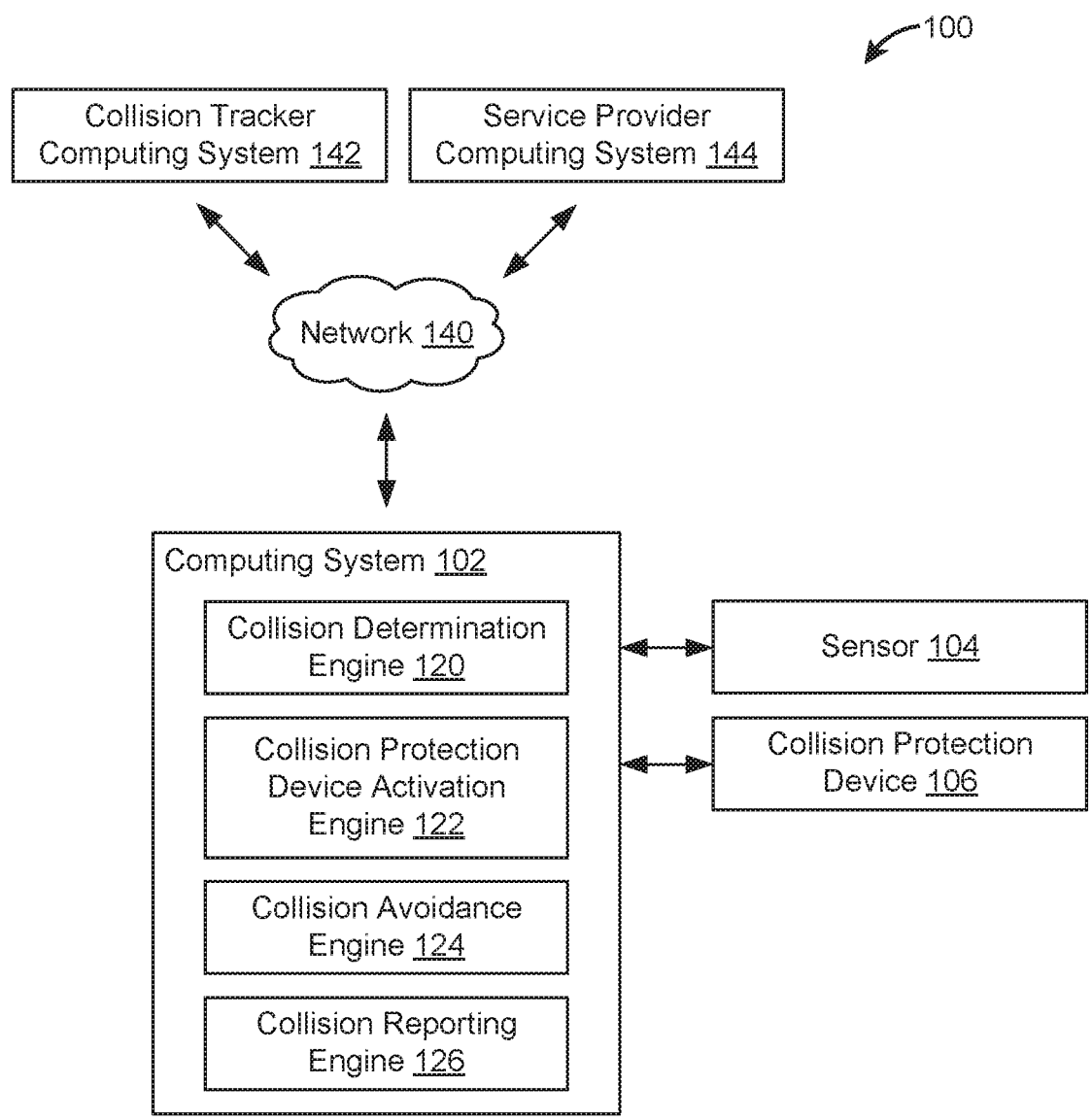
FIG. 1 illustrates an example environment of a collision protection system.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Systems, methods, and non-transitory computer-readable media are provided for collision prevention. In some embodiments, after receiving sensor data (e.g., Lidar data, video data, collected by sensors, a trajectory of the a vehicle (e.g., an autonomous vehicle) with respect to another vehicle (or an object, such as a wall, a building structure, a traffic control device, a pedestrian) can be determined using a trajectory prediction model and the sensor data. Based on the trajectory of the vehicle with respect to the other vehicle, a collision event (e.g., an impact) between the two vehicles with respect to two contacting locations on the vehicles can be determined or predicted. For example, the collision event can involve the front end of the vehicle hitting the back end of the other vehicle. As another example, the collision event can involve the vehicle being rear-ended by the other vehicle. After determining the collision event would occur, a collision protection device (e.g., an airbag that is at least partially on the exterior of the vehicle when inflated or activated and covers the back of the vehicle) can be activated at a determined time. Additionally or alternatively, the trajectory of the vehicle can be altered to minimize the effects of the collision event. The particular collision protection device activated can be determined based on the altered trajectory of the vehicle.

The collision protection device can minimize the effects of the collision with respect to the vehicle and/or the other vehicle (or a building structure, a traffic control device, a pedestrian). The collision protection device when not activated can be invisible or minimally visible with respect the surrounding area of the collision protection device. The collision protection device when activated can be visible. The collision protection device can be easily replaceable.

The particular collision protection device activated and the time the collision protection device is activated can be selected and determined based on properties of the collision event, properties of the two vehicles, and the contacting locations with respect to the vehicles. For example, for a small collision, a collision protection device that is smaller and/or covers a smaller area of the vehicle. As another example, a collision protection device can be activated immediately if the vehicles are traveling at high speeds and a large collision would occur imminently.

The trajectory prediction model can be, for example, a model that implements one or more computer vision and machine learning methods and models. The trajectory prediction model can determine the trajectory of the vehicle with respect to the other vehicle based on the rotation angle of the other vehicle. The trajectory of the vehicle can be a function of time and the rotation angle of the other vehicle.

The collision protection device can be activated only when the collision event is substantial or serious (e.g., above a predetermined threshold). The collision protection device can be activated when the collision event involves the vehicle with a person such as a pedestrian. The collision protection device can include multiple airbags or airbag inflation parts (e.g., to cover a sufficient area). The collision protection device can include multiple inflators to, for example, expand further and/or to be in an active state for longer.

FIG. 1 illustrates an example environment of a collision protection system 100. The example environment 100 can include a computing system 102, a sensor 104 (or a plurality of sensors 104), and a collision protection device 106 (or a plurality of collision protection devices 106). The computing system 102 can be communicatively, electrically, and/or mechanically coupled to one or more other components of the environment 100. For example, the computing system 102 can be coupled to the sensor 104 and/or the collision protection device 106 for collision protection. The coupling between the different components within the environment 100 can include direct coupling and/or indirect coupling. For example, coupling between the computing system 102 and the collision protection device 106 can include coupling between one or more components of the computing system 102 and one or more components of a vehicle (e.g., an autonomous vehicle, the vehicle 200 described with reference to FIGS. 2A-2C and the vehicles 300a, 300b described with reference to FIGS. 3A-3B) that controls the activation of the collision protection device 106.

While components 102, 104, 106 of the environment 100 are shown in FIG. 1 as single entities, this is merely for ease of reference and is not meant to be limiting. For example, one or more components/functionalities of the computing system 102 described herein can be implemented, in whole or in part, within a single computing device or within multiple computing devices. The sensor 104 and/or the collision protection device 106 can include a single tool/component or multiple tools/components that provide functionalities described herein. For example, the sensor 104 can include a single sensor, multiple sensors of the same type, or different types of sensors. As another example, the collision protection device 106 can include a single collision protection device 106 of a vehicle or multiple collision protection devices 106 of the vehicle.

The sensor 104 can refer to a device that detects or measures one or more properties (e.g., physical properties) of an environment of the sensor and/or one or more devices coupled to the sensor. The sensor 104 can include one or more of an image sensor, an audio sensor, a temperature sensor, a humidity sensor, a weather sensor, a vehicle speed sensor, a wheel speed sensor, a proximity sensor, a pressure sensor, a seat belt sensor, an accelerometer, a tilt sensor, an inclination sensor, an angular rate sensor, a gyroscope, an inertial measurement unit (IMU), a LIDAR sensor, a location sensor, a motion sensor, a magnetometer, a radar detector, a radar sensor, a vibration sensor, a light detection sensor, an engine control unit sensor, a physiological sensors, and/or other sensors. For example, an image sensor can include a sensor (e.g., camera, sensor within a camera) that detects and/or conveys information that constitutes an image or a video. The image sensor can be configured to capture image(s) and/or video(s) of one or more objects (e.g., person, body part of a person, a thing, a thing used by a person) outside the vehicle. The image(s) and/or video(s) can depict the location and/or the movement of the object outside the vehicle. The image(s) and/or video(s) can depict relative position of the object with respect to the vehicle. For example, a proximity sensor can refer to a sensor that is able to detect presence of nearby objects without any physical contact.

The sensor 104 can be part of a vehicle. The sensor 104 be remote from the vehicle. The sensor 104 can be position within (e.g., partially or completely) a vehicle and/or positioned outside (e.g., partially or completely) the vehicle. The sensor 104 can be operationally coupled to the vehicle. For example, the sensor 104 can be mechanically, electrically, and/or communicatively coupled to the vehicle.

In some embodiments, a collision protection device 106 can comprise an inflatable device, a thrusting device, and an object protector. For example, an inflatable device can be activated when the collision event involves the vehicle and a pedestrian. As another example, a thrusting device (e.g., a reverse gas thruster for decreasing the speed of the vehicle and/or change the trajectory of the vehicle) can be activated when the collision event involves the vehicle hitting a wall. As yet another example, an object protection (e.g., a car door protector, a bumper protector, and a grill protector) can be activated when the collision event involves a small collision not involving a pedestrian.

A collision protection device 106 can be positioned outside (e.g., partially or completely) the vehicle and/or positioned within (e.g., partially or completely) the vehicle. The collision protection device 106 can refer to a device that can be activated or inflated, such as an airbag. For example, the collision protection device can comprise an inflatable gas bag and a gas generator, which in the case of activation provides a gas for filling the gas bag. In the inflated state, the gas bag encloses a gas bag chamber. The gas bag chamber can include one, two, three, or more tubular portions (or portions of other shapes, such as circular portions). The tubular portions can be arranged one beside another other such that the rotational axes of the cylinders extend substantially parallel to each other.

In some embodiments, the computing system 102 can include one or more processors and memory. The processor(s) can be configured to perform various operations by interpreting machine-readable instructions stored in the memory. The environment 100 can also include one or more datastores that are accessible to the computing system 102 (e.g., stored in the memory of the computing system 102, coupled to the computing system, accessible via one or more network(s)). In some embodiments, the datastore(s) includes various databases, application functionalities, application/data packages, and/or other data that are available for download, installation, and/or execution.

In various embodiments, the computing system 102 can include a collision determination engine 120, a collision protection device activation engine 122, and/or other engines. While the computing system 102 is shown in FIG. 1 as a single entity, this is merely for ease of reference and is not meant to be limiting. One or more components/functionalities of the computing system 102 described herein can be implemented, in whole or in part, within a single computing device or within multiple computing devices. One or more portions of the computing system 102 can be implemented within a vehicle (e.g., an autonomous vehicle). One or more portions of the computing system 102 can be implemented remotely from a vehicle (e.g., server).

Collision Determination Engine. The collision determination engine 120 can receive sensor data collected by the sensor 104. The collision determination engine 120 can determine a trajectory of a vehicle (e.g., an autonomous vehicle, the vehicle 200 described with reference to FIGS. 2A-2C and the vehicles 300a, 300b described with reference to FIGS. 3A-3B) with respect to an object using a trajectory prediction model and the sensor data. The object can be a person on a sidewalk or crossing a street, another vehicle, a building structure (e.g., a fence), a traffic control device (e.g., a traffic light), or an object on the sidewalk (e.g., a trashcan).

In some embodiments, the trajectory prediction model comprises a machine learning model, such as a neural network. The machine learning model can comprise a dynamical model, a maneuver-based model, an interaction aware model, or a combination thereof. The trajectory prediction model can implement one or more computer vision algorithm.

The collision determination engine 120 can determining a collision event of the vehicle with the object at a contacting location with respect to the vehicle and a contacting location with respect to the object based on the trajectory of the vehicle with respect to the object involved in the collision event.

In some embodiments, the collision determination engine 120 can determine the trajectory of the vehicle with respect to the object involved in the collision event in a reference frame of the vehicle using the trajectory prediction model and the sensor data. In some embodiments, the collision determination engine 120 can determine the trajectory of the object in an absolute reference frame; determine a trajectory of the object in the absolute reference frame; and determine the trajectory of the vehicle with respect to the trajectory of the object in the absolute reference frame.

Collision Protection Device Activation Engine. In response to the collision determination engine 120 determining the collision event, the collision protection device activation engine 122 can activate a collision protection device 106 (e.g., an inflatable device, a thrusting device, or an object protector). The collision protection device activation engine 122 can activate the collision protection device 106 at a time. The collision protection device activation engine 122 can determine the time to activate the collision protection device 106 based on one or more properties of the collision event, one or more properties of the vehicle, one or more properties of the object, the first contacting location with respect to the vehicle, and the contacting location with respect to the object.

The particular collision protection device 106 activated and the time the collision protection device 106 is activated can be selected and determined based on properties of the collision event, properties of the two vehicles, and the contacting locations with respect to the vehicles. For example, for a small collision, a collision protection device 106 that is smaller and/or covers a smaller area of the vehicle. As another example, a collision protection device 106 can be activated immediately if the vehicles are traveling at high speeds and a large collision would occur imminently. For example, the particular collision protection device 106 selected for activation can be based on the types and sizes of the vehicles in the collision event, such as a small car, a large car, a pickup truck, and the speeds of the vehicles. As another example, if a person such as a pedestrian is determined or predicted to be involved in the collision event, a collision protection device 106 such as an airbag that expands gradually and/or with a soft energy absorbing surface can be activated such that the activation of the collision protection device 106 does not cause additional harm to the person and/or the harm caused by the activation of the collision protection device 106 to the person is minimized. For example, a collision protection device 106 that covers (e.g., partially or completely) the contacting location with respect to the vehicle, when activated, can be activated. If the vehicle's bumper would hit the other vehicle, a collision protection device 106 that covers the bumper of the vehicle, when activated, can be activated. The collision protection device 106 can be on the bumper cover, on the surface of the bumper cover, under the bumper cover, and/or inside the bumper cover (e.g., inside a space designed for housing of the collision protection device 106 when not activated, such as the spaces 302br for housing the collision protection device 106br1 illustrated in FIGS. 3A-3B). As another example, a larger collision protection device 106 can be activated when the other vehicle's side would be involved in the collision event, and a smaller collision protection device 106 can be activated when the other vehicle's front or back would be involved in the collision event.

The collision protection device 106 can be activated 0.1 second, 0.2 second, etc. before the collision event is determined to occur to allow sufficient time for the collision protection device 106 (e.g., an external airbag) to be activated, inflated, and/or expanded and the collision protection device 106 to be in an active state (e.g., an optimal inflated state) when the collision event occurs. The time the collision protection device 106 is activated can depend on the activation (e.g., inflated) can depend on the activation (e.g., inflation) mechanism. For example, the collision protection device 106 can be activated sooner if the activation of the collision protection device 106 requires more time to reach an active state.

In some embodiments, the collision protection device activation engine 122 can determine the time to activate the collision protection device 106 based on: one or more properties of collision protection device 106, one or more properties of the collision event, one or more properties of the vehicle, one or more properties of the object, the contacting location of with respect to the vehicle, and/or the contacting location with respect to the object involved in the collision event. For example, the time an airbag should be deployed or activated can be based on the time required to activate the airbag and the predicted time of the collision.

In some embodiments, the collision protection device activation engine 122 can select the collision protection device 106, associated with the contacting location with respect to the vehicle, from a plurality of collision protection devices 106 based on the contacting location with respect to the vehicle. For example, if the collision event involves the front of the car hitting another car, the airbag at the front of the car should be activated. In some embodiments the collision protection device activation engine 122 can select the collision protection device 106 from a plurality of collision protection devices 106 based on: one or more properties of the collision event, one or more properties of the vehicle, one or more properties of the object, the contacting location with respect to the vehicle, the contacting location with respect to the object involved in the collision event, and/or the area covered by each collision protection device 106. For example, a large airbag can be activated for a bigger collision. As another example, the size of the vehicles can affect the size of the airbag deployed. For example, an airbag can be activated if the vehicle will hit a person, and a thruster can be used if the vehicle will hit a wall. As another example, if the collision event involves the front of the vehicle hitting an object, the airbag at the front of the vehicle can be activated.

Figure 2A:
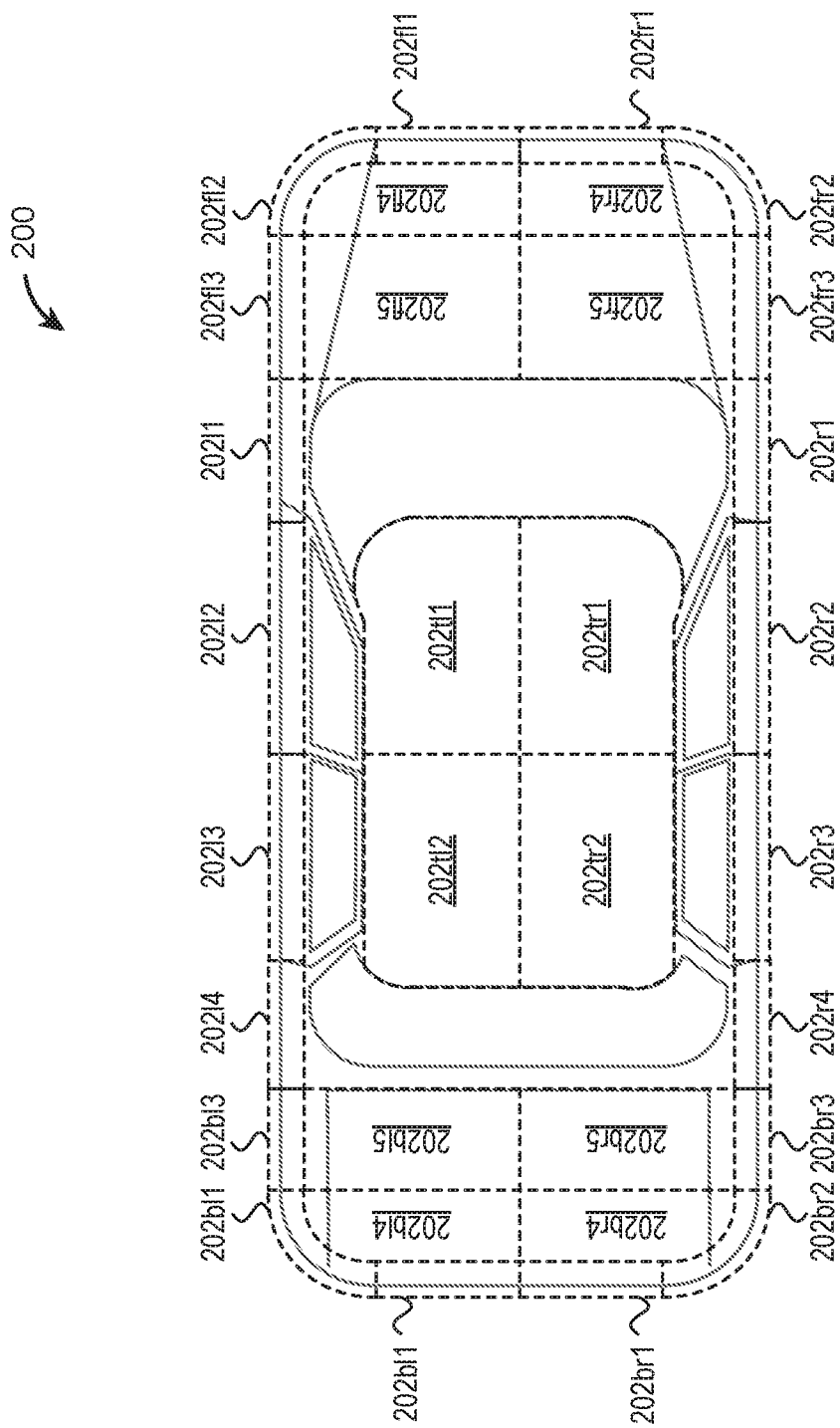
FIG. 2A illustrates an example environment for collision protection devices.

The plurality of collision protection devices 106 can be designed to cover various areas of the vehicle. FIG. 2A is an example environment for collision protection devices 106 that are configured to protect areas 202*fl*1-202*fl*5, 202*fr*1-202*fr*5, 202*l*1-202*l*4, 202*tl*1-202*tl*2, 202*tr*1-202*tr*2, 202*r*1-202*r*4, 202*bl*1-202*bl*5, 202*br*1-202*br*5 of the vehicle 200.

Figure 2B:
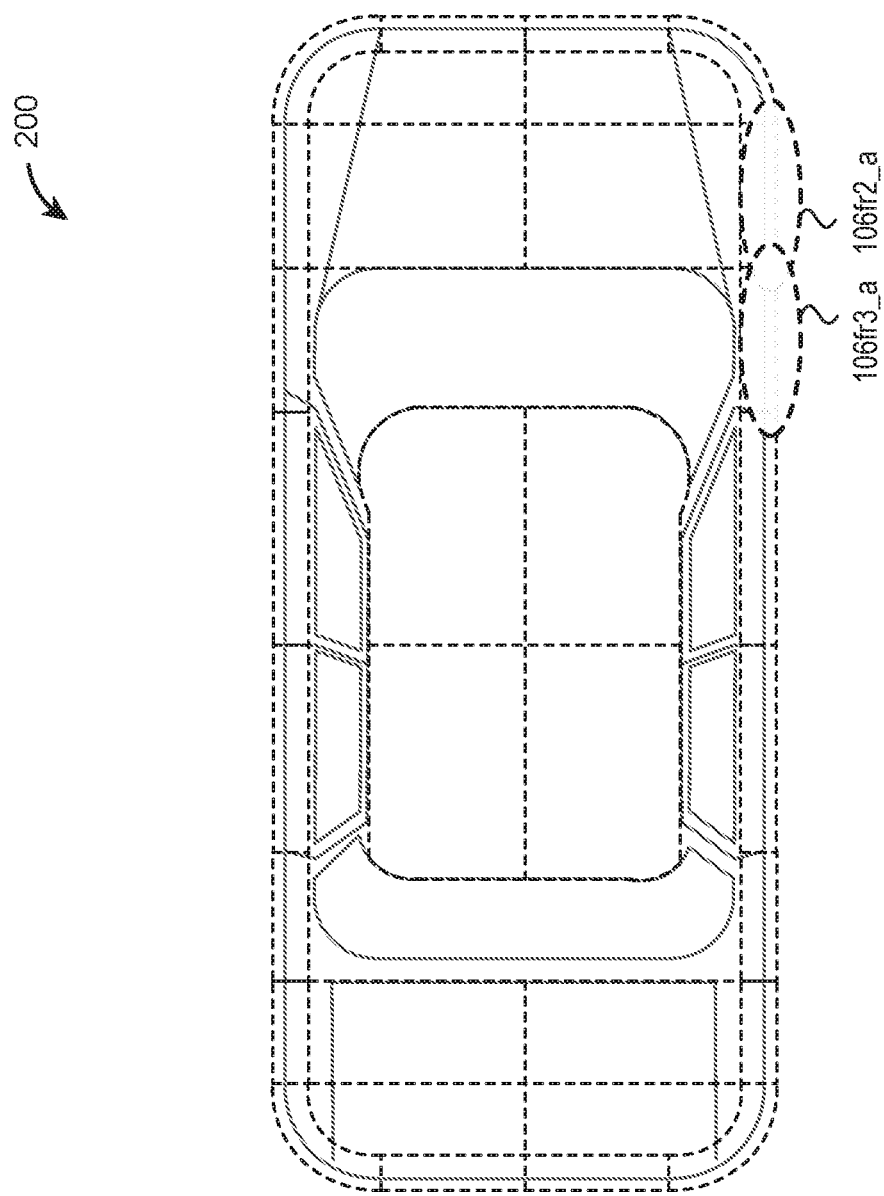
FIGS. 2B-2C illustrate example activated states of collision protection devices.

Referring to FIG. 2B, the collision protection device activation engine 122 can further activate another collision protection device 106 (e.g., the collision protection devices 106*fr*2, 106*fr*3) at a time. For example, the collision protection device 106 can include multiple airbags or airbag inflation parts (e.g., to cover a sufficient area). Given the size of the collision event, multiple airbags may need to be deployed on after another or at the same time. FIG. 2B illustrates two collision protection devices 106*fr*2, 106*fr*3 in their activated states 106*fr*2_*a*, 106*fr*3_*a*. The collision protection device activation module 122 can determine whether and when to activate the other collision protection device 106 based on one or more properties of the other collision protection device 106. The one or more properties of the other collision protection device 106 can comprise a duration the other collision protection device 106 being activated and/or the time required to activate the other collision protection device 106. The other protection device 106 can be at least partially on the exterior of the vehicle when activated. The other collision protection device 106 can be activated before, after, or when the collision protection device 106 is activated.

Figure 2C:
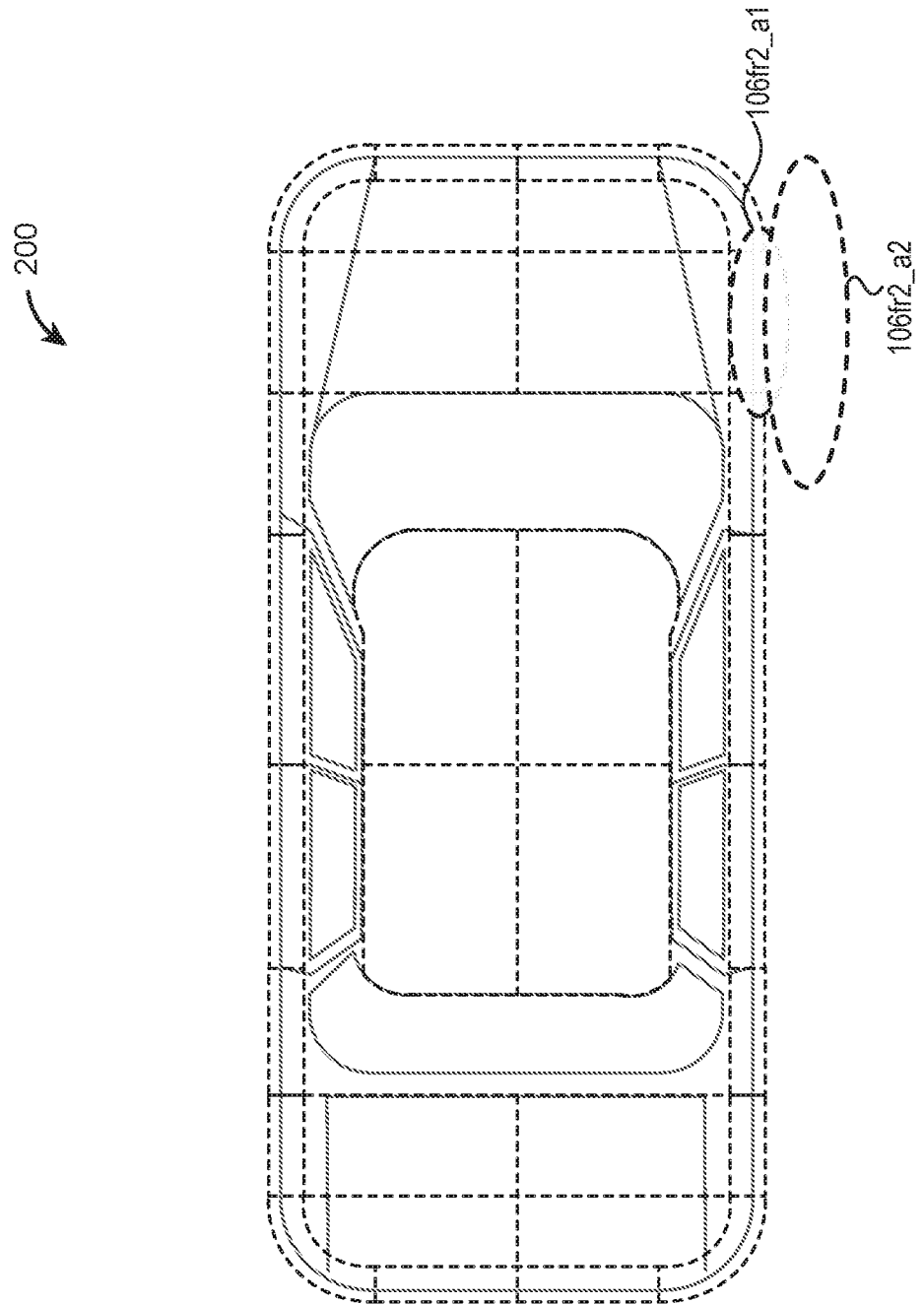

The collision protection device 106 can include multiple inflators to, for example, expand further and/or to be in an active state for longer. Referring to FIG. 2C, the collision protection device activation engine 122 can activate a first activation mechanism of the collision protection device 106 at a first time; and activating a second activation mechanism of the collision protection device 106 at the second time. For example, the collision protection device 106 can be a multi-stage airbag, such as a two-stage airbag. FIG. 2C shows a multi-stage collision protection device 106*fr*2 in an activated stage. The multi-stage collision protection device 106*fr*2 illustrated comprises two gas bags 106*fr*2_*a*1, 106*fr*2_*a*2 enclosing gas bag chambers in the inflated state.

Figure 3A:
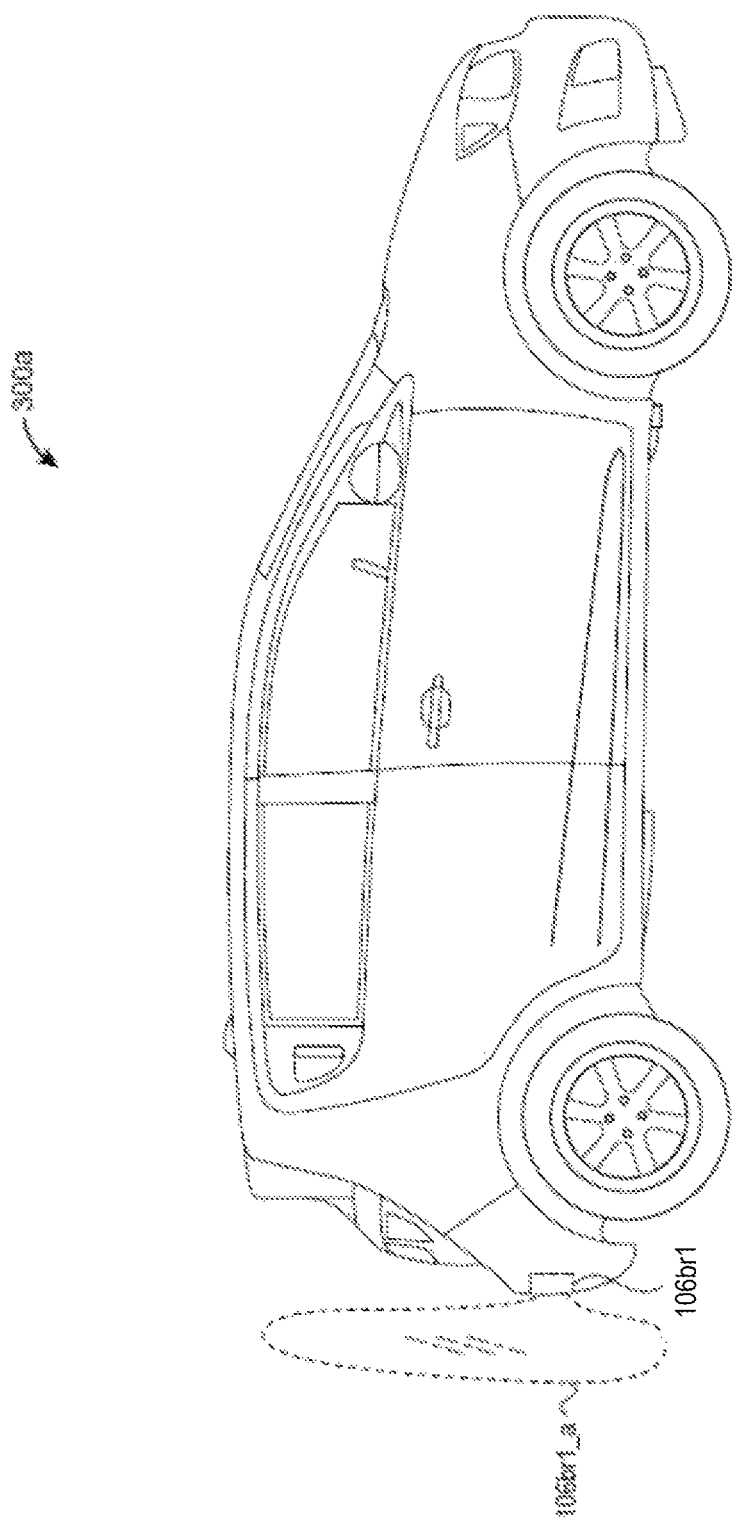
FIGS. 3A-3B illustrate example activated states of collision protection devices.
Figure 3B:
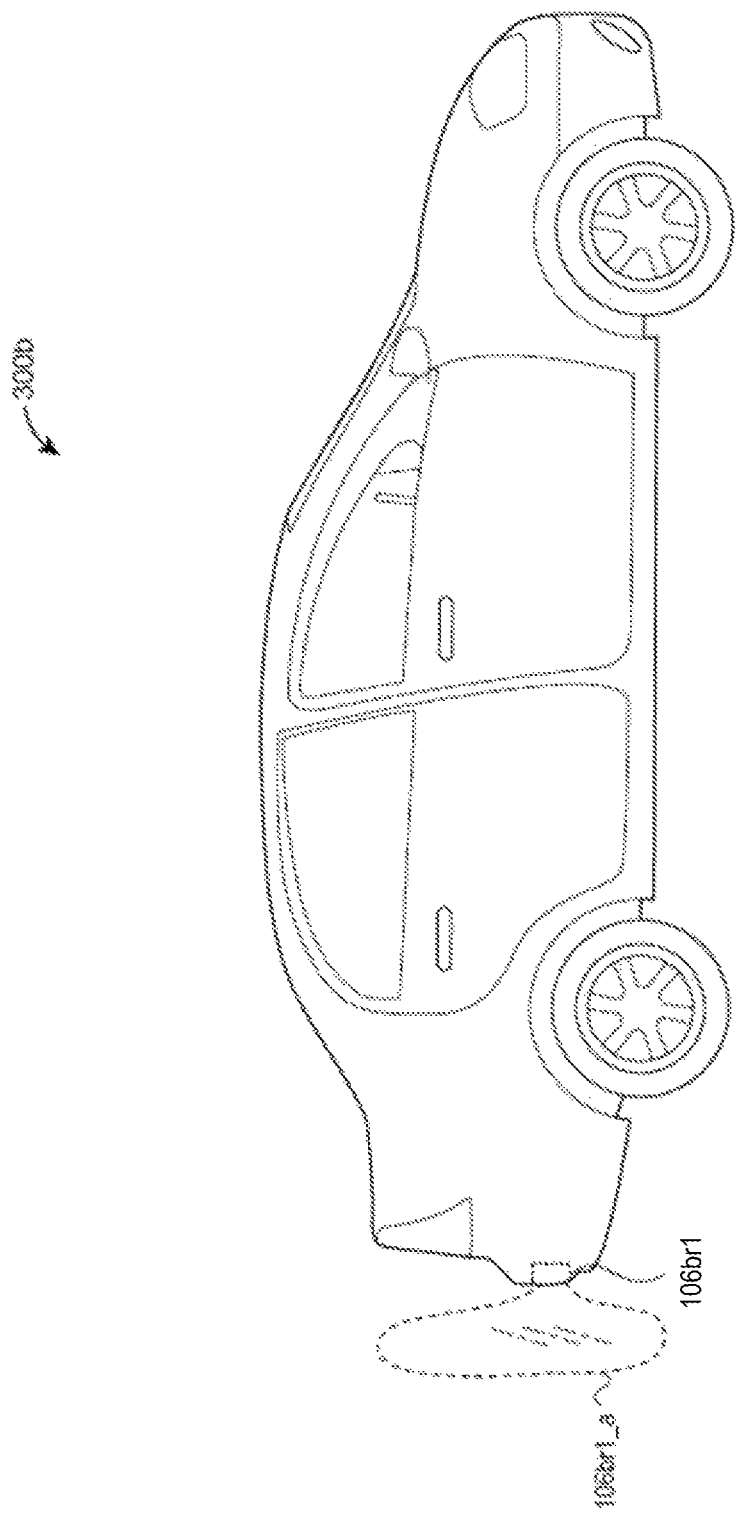

The collision protection device 106 can be at least partially on the exterior of the vehicle when activated. The collision protection device 106 can cover at least partially the contacting location with respect to the vehicle when activated. For example, the collision event can involve the vehicle being rear-ended on the rear right by another vehicle. After determining the collision event would occur, a collision protection device (e.g., an airbag 106*br*1 that is at least partially on the exterior of the vehicle when inflated or activated and covers the rear right of the vehicle) can be activated. FIGS. 3A-3B illustrate example activated states 106*br*1_*a*1, 106*br*1_*a*2 of the collision protection device 106*br*1. In some embodiments, the contacting location with respect to the vehicle is a rear location of the vehicle. For example, the contacting location with respect to the vehicle can be the trunk of the vehicle when the collision event determined is the vehicle being rear-ended by another vehicle.

Referring to FIG. 1, the computing system includes a collision avoidance engine. The collision avoidance engine can determine a desirable trajectory of the vehicle. The collision avoidance engine can cause the trajectory of the vehicle to change based on the trajectory of the vehicle and the desirable trajectory of the vehicle. For example, the vehicle can be an autonomous vehicle, and the trajectory of the vehicle can be altered to minimize the effects of the collision event. The particular collision protection device 106 activated can be determined based on the altered trajectory of the vehicle.

In some embodiments, the computing system includes a collision reporting engine. The collision reporting engine can report the collision event. For example, the collision reporting engine can generate and send a report of information associated with the collision event determined and/or actual collision event happened (e.g., the one or more collision protection devices 106 activated) via a network 140 to a computer server 142 keeping track of collision events. The collision reporting engine 126 can cause a service provider to replace the collision protection device 106 activated. For example, the collision reporting engine 126 can send a request, via the network 140 to a computing system 144 of the service provider receiving such requests.

In some embodiments, the collision protection device 106 can be activated only when the collision event is substantially or serious (e.g., above a predetermined threshold). The collision protection device 106 can be activated when the collision event involves the vehicle with a person such as a pedestrian.

Collision Protection Method

Figure 4:
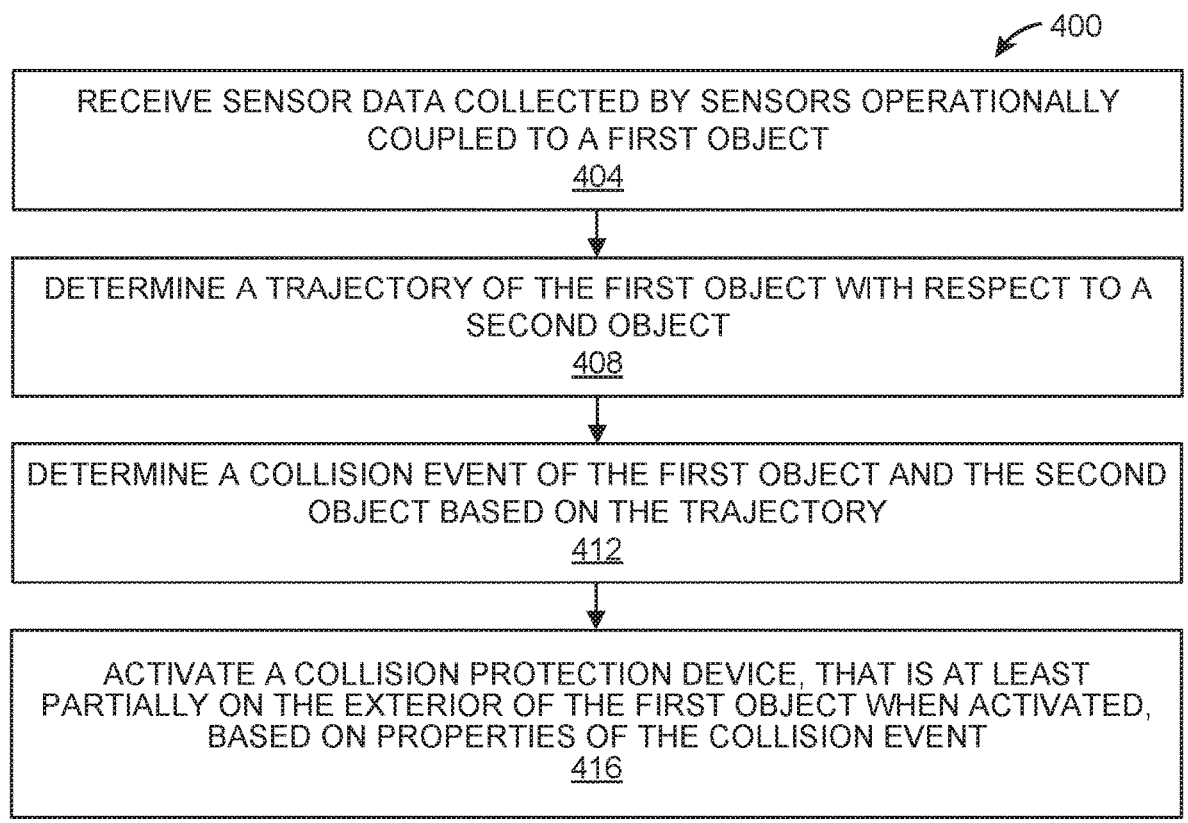
FIG. 4 is a flow diagram showing a non-limiting exemplary process of collision protection.

FIG. 4 is a flow diagram showing an example method 400 for collision protection, according to various embodiments of the present disclosure. The method 400 can be implemented in various environments including, for example, the environment 100 of FIG. 1, using one or more computing systems, such as the computing system 102. The operations of method 400 presented below are intended to be illustrative. Depending on the implementation, the example method 400 can include additional, fewer, or alternative steps performed in various orders or in parallel. The example method 400 can be implemented in various computing systems or devices including one or more processors.

At block 404, the computing system can receive sensor data collected by a plurality of sensors (e.g., the sensor 104) operationally coupled to the computing system. The computing system can be operationally coupled to a plurality of collision protection devices (e.g., the collision protection device 106). The computing system can be part of a first object (e.g., an autonomous vehicle). Each sensor can be positioned within the vehicle or outside the vehicle. Each collision protection device can be positioned within the vehicle or outside the vehicle.

In some embodiments, the plurality of sensors comprises a Light Detection and Ranging (Lidar), a Radio Detection and Ranging (Radar), an imaging device, an ultrasonic sensor, a vehicle telemetry sensor, an inertial measurement unit (IMU), and a global positioning system (GPS) sensor.

In some embodiments, the plurality of collision protection devices can comprise an inflatable device, a thrusting device, and an object protector.

At block 408, the computing system can determine a first trajectory of the first object with respect to a second object using a trajectory prediction model and the sensor data. In some embodiments, the first object is a first motor vehicle, and/or the second object is a person, a second motor vehicle, a building structure, a traffic control device, or a combination thereof. In some embodiments, the first object is a first motor vehicle, the second object is a second motor vehicle, and the first contacting location with respect to the first object is a rear location of the first motor vehicle.

In some embodiments, the trajectory prediction model comprises a machine learning model. The machine learning model can comprise a dynamical model, a maneuver-based model, an interaction aware model, or a combination thereof.

At block 412, the computing system can determine a collision event of the first object with the second object at a first contacting location with respect to the first object and a second contacting location with respect to the second object based on the first trajectory of the first object with respect to the second object.

In some embodiments, to determine said first trajectory of the first object, the computing system can determine the first trajectory of the first object with respect to the second object in a reference frame of the first object using the trajectory prediction model and the sensor data. In some embodiments, to determine said first trajectory of the first object, the computing system can determine the first trajectory of the first object in an absolute reference frame; determine a second trajectory of the second object in the absolute reference frame; and determine the first trajectory of the first object with respect to the second trajectory of the second object in the absolute reference frame.

At block 416, the computing system can activate a first collision protection device of the plurality of collision protection devices. The first collision protection device can be at least partially on the exterior of the first object when activated. The first collision protection device can be activated at a first time. The first time of the first collision protection device being activated can be determined based on: one or more of a plurality of properties of the collision event, one or more of a plurality of properties of the first object, one or more of a plurality of properties of the second object, the first contacting location with respect to the first object, and the second contacting location with respect to the second object.

In some embodiments, the first collision protection device covers at least partially the first contacting location with respect to the first object when activated.

In some embodiments, the computing system can determine the first time to activate the first collision protection device based on: one or more of a plurality of properties of the first collision protection device, the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, said activating comprises: activating a first activation mechanism of the first collision protection device at the first time; and activating a second activation mechanism of the first collision protection device at the second time. Said activating can comprise activating a second collision protection device of the plurality of collision protection devices, the second collision protection device is at least partially on the exterior of the first object when activated, at a second time. The one or more of the plurality of properties of the first collision protection device can comprise a first duration of the first collision protection device, and/or the one or more of the plurality of properties of the second collision protection device can comprise a second duration of the second collision protection device. The first time to activate the first collision protection device and the second time to activate the second collision protection device can be identical. The first time to activate the first collision protection device can be prior to the second time to activate the second collision protection device.

In some embodiments, the computing system can select the collision protection device, associated with the first contacting location with respect to the first object, from a plurality of collision protection devices based on the first contacting location with respect to the first object. In some embodiments, the computing system can: select the first collision protection device from a plurality of collision protection devices based on: the one or more of the plurality of properties of the collision event, the one or more of the plurality of properties of the first object, the one or more of the plurality of properties of the second object, the first contacting location with respect to the first object, and/or the second contacting location with respect to the second object.

In some embodiments, the computing system can determine a desirable first trajectory of the first object; and causing the first trajectory of the first object to change based on the first trajectory of the first object and the desirable first trajectory of the first object.

In some embodiments, the computing system can: report the collision event; and/or causing a service provider to replace the collision protection device.

Computer Vision, Machine Learning, and Neural Network

Computer Vision. One or more computer vision algorithms can be implemented for trajectory prediction. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth. One or more of these computer vision algorithms can be used in trajectory prediction described herein, e.g., to determine the trajectory of a vehicle with respect to an object.

Machine Learning. Trajectory prediction can additionally or alternatively be performed by a variety of machine learning algorithms. Once trained, the machine learning algorithm can be stored in a computing system (e.g., the computing system 102 described with reference to FIG. 1 and the computing system 500 described with reference to FIG. 5). Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. One or more of the machine learning algorithms can be used in trajectory prediction described herein, e.g., to determine the trajectory of a vehicle with respect to an object.

Neural Network. A layer of a neural network (NN), such as a deep neural network (DNN) can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the computing system 102 descried with reference to FIG. 1 and the processor 504 described with reference to FIG. 5) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
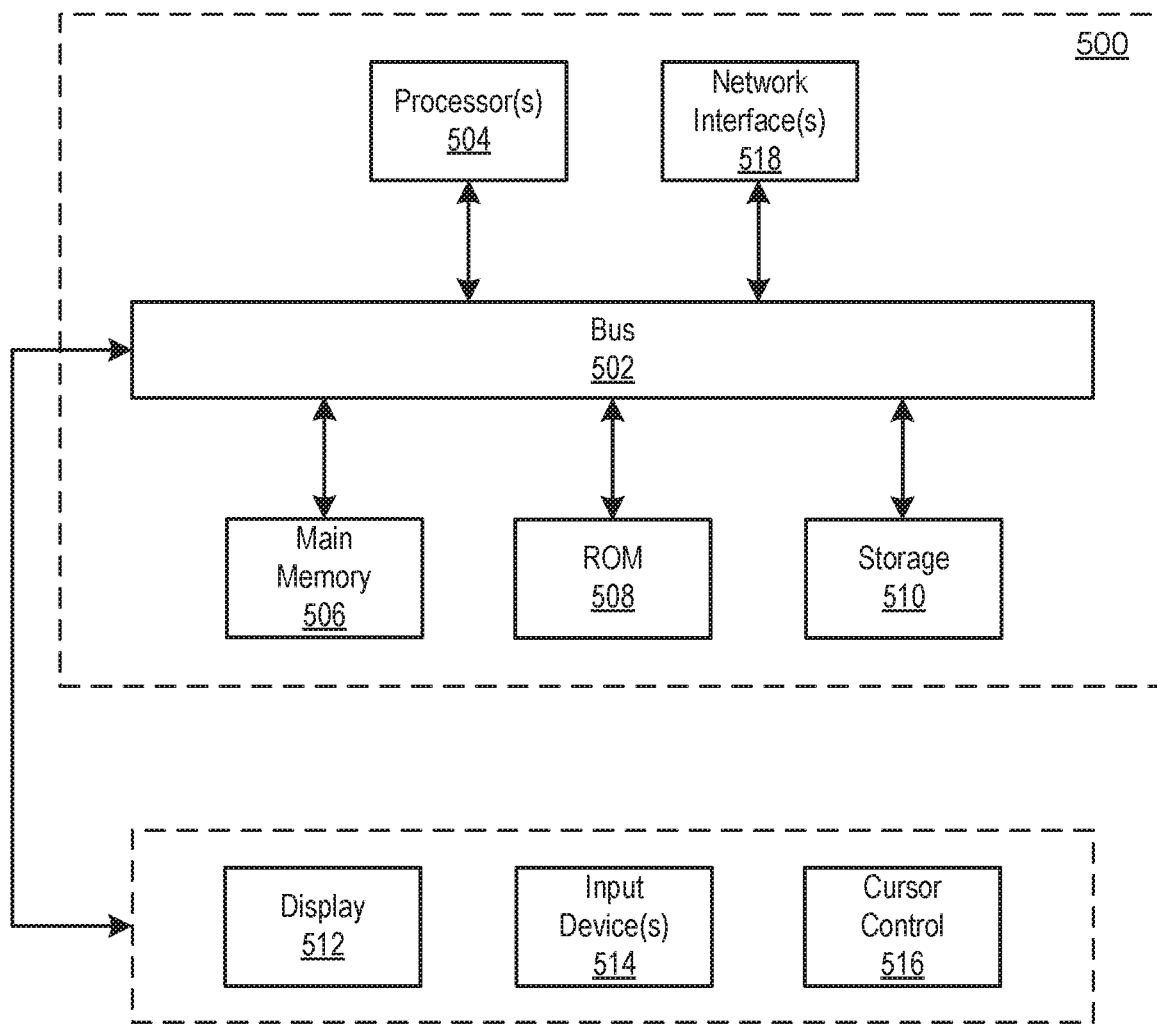
FIG. 5 illustrates a block diagram of an example computer system in which any of the embodiments described herein can be implemented.

FIG. 5 is a block diagram that illustrates a computer system 500 upon which any of the embodiments described herein may be implemented. The computer system 500 includes a bus 502 or other communication mechanism for communicating information, one or more hardware processor 504 coupled with bus 502 for processing information. Hardware processor 504 or processors may be, for example, one or more general purpose microprocessors.

The computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen lacking a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 52 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated service digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors)

may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A collision protection system comprising:
    a plurality of collision protection devices operationally coupled to a first object;
    a plurality of sensors operationally coupled to the first object;
    a memory storing executable instructions; and
    one or more processors in communication with the plurality of collision protection devices, the plurality of sensors, and the memory, the one or more processors programmed by the executable instructions to perform a method comprising:
        receiving sensor data collected by the plurality of sensors;
        determining, based on the sensor data, a first trajectory of the first object with respect to a second object using a trajectory prediction model implemented based on a neural network, wherein the neural network applies one or more transformations to the sensor data, through neural layers of the neural network, to determine the first trajectory;
        determining, based on the first trajectory, a collision event to occur between the first object and the second object at a contact location of the first object;
        activating, prior to the collision event, at a first time, a first collision protection device based on a type and a size of the second object, the first collision protection device being at least partially on a first exterior of the first object corresponding to the contact location, wherein the activating comprises:
            determining a size of the first collision protection device based on a particular segment of the second object that directly contacts the first object during the collision event, wherein a remainder of the second object besides the particular segment does not directly contact the first object during the collision event; and
            determining the first time relative to the collision event based on a duration to activate the first collision protection device;
        determining that the collision event exceeds coverage of the first collision protection device; and
        activating, at a second time, a second collision protection device, the second collision protection device being at least partially on a second exterior of the first object adjacent to the first exterior.

2. The system of claim 1, wherein the plurality of sensors comprises at least one of a Light Detection and Ranging (Lidar) sensor, a Radio Detection and Ranging (Radar) sensor, an imaging device, an ultrasonic sensor, a vehicle telemetry sensor, an inertial measurement unit (IMU), or a global positioning system (GPS) sensor.

3. The system of claim 1, wherein the first object is a first motor vehicle, wherein the second object is a second motor vehicle, and wherein the contact location is at a rear location of the first motor vehicle.

4. The system of claim 1, wherein the trajectory prediction model is based on a machine learning model.

5. The system of claim 4, wherein the machine learning model comprises at least one of a dynamical model, a maneuver-based model, an interaction aware model, or a combination thereof.

6. The system of claim 1, wherein determining the first trajectory of the first object comprises:

determining the first trajectory of the first object in a reference frame of the first object using the trajectory prediction model based on the sensor data.

7. The system of claim 1, wherein determining the first trajectory of the first object comprises:
determining the first trajectory of the first object in an absolute reference frame;
determining a second trajectory of the second object in the absolute reference frame; and
determining the first trajectory of the first object with respect to the second trajectory of the second object in the absolute reference frame.

8. The system of claim 1, wherein the first collision protection device covers at least partially the contact location when activated.

9. The system of claim 1, wherein the plurality of collision protection devices comprises at least one of an inflatable device, a thrusting device, or an object protector.

10. The system of claim 1, wherein activating the first collision protection device comprises:
activating, at a first activation time, a first activation mechanism of the first collision protection device; and
activating, at a second activation time, a second activation mechanism of the first collision protection device, wherein the second activation time is after the first activation time.

11. The system of claim 1, wherein the first collision protection device is activated within a first duration, and wherein the second collision protection device is activated within a second duration.

12. The system of claim 1, wherein the first time to activate the first collision protection device and the second time to activate the second collision protection device are identical.

13. The system of claim 1, wherein the first time to activate the first collision protection device is prior to the second time to activate the second collision protection device.

14. The system of claim 1, wherein the one or more processors are further programmed by the executable instructions to perform:
determining the first time to activate the first collision protection device based on:
one or more properties of the first collision protection device;
one or more properties of the collision event;
one or more properties of the first object;
one or more properties of the second object; and
the contact location.

15. The system of claim 1, wherein the one or more processors are further programmed by the executable instructions to perform:
selecting a collision protection device from the plurality of collision protection devices based on the contact location.

16. The system of claim 1, wherein the one or more processors are further programmed by the executable instructions to perform:
selecting the first collision protection device from the plurality of collision protection devices based on:
one or more properties of the collision event;
one or more properties of the first object;
one or more properties of the second object; and
the contact location.

17. The system of claim 1, wherein the one or more processors are further programmed by the executable instructions to perform:
determining, based on the sensor data, a desirable first trajectory of the first object using the trajectory prediction model; and
causing the first trajectory of the first object to change based on the desirable first trajectory of the first object.

18. The system of claim 1, wherein the one or more processors are further programmed by the executable instructions to perform:
transmitting information relating to the collision event to a service provider; and
causing the service provider to replace the first collision protection device.

19. The system of claim 1, wherein the neural network comprises at least one of a normalization layer, a convolutional layer, a soft sign layer, a rectified linear layer, a concatenation layer, a pooling layer, a recurrent layer, an inception-like layer, or a combination thereof.

20. The system of claim 1, wherein, in response to the second object being a person, the activating comprises setting a rate of expansion of the first collision protection device to below a threshold rate.

* * * * *